2,828,310
Patented Mar. 25, 1958

2,828,310

UREIDE OF THIAMINE AND METHOD OF PREPARATION THEREOF

Reginald Auchincloss, New York, N. Y.

No Drawing. Application February 20, 1957
Serial No. 641,422

9 Claims. (Cl. 260—256.6)

The present invention is directed to a method of preparing ureide of thiamine and to the resulting product.

It is among the objects of the present invention to prepare a substance which has properties rendering it an antivitamin to thiamine.

It is also among the objects of the present invention to provide a simple and effective procedure for the treatment of thiamine in order to modify it and produce a substance which inhibits the action of vitamin.

In practicing the invention, thiamine preferably in the form of its hydrochloride, is dissolved in water. Into this solution is introduced a water-soluble cyanate, preferably cyanate of an alkali metal. The solution is allowed to stand for a relatively short time so that usually a small amount of a precipitate is formed, which is filtered off. The resulting mother liquor is allowed to stand for a number of hours, during which period there gradually precipitates a crystalline substance which is the ureide of thiamine. In order ot facilitate the reaction, the mixture is maintained at a relatively low temperature, below normal atmospheric temperature and preferably in the neighborhood of 0° C. The initial product may be purified by dissolving it in a small amount of water, introducing a volatile organic solvent and reprecipitating the ureide of thiamine in pure form. The product has most likely the following structural formula:

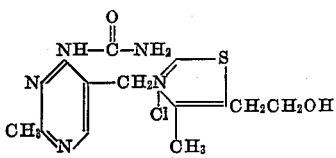

The following is a specific example of the operation of the present process:

5.2 grams (1 mol.) of thiamine hydrochloride is dissolved in about 5 cc. of a 1% hydrochloric acid solution and the resulting solution is chilled in an ice bath. There is separately provided an aqueous solution containing 1.3 grams (1 mol.) of potassium cyanate, which is also chilled and is added to the thiamine hydrochloride solution. The mixture is agitated for about twenty minutes in an ice bath at a temperature from 1° to 3° C. A small amount of a white precipitate is formed and is filtered from the reaction mixture.

The filtrate is placed in a refrigerator for about twenty-four hours, causing the precipitation of white crystals, which were separated from the mother liquor by filtration. 2.9 grams of these crystals are obtained, giving a yield of about 55%. The crystals are dissolved in a minimum amount of water and acetone is added thereto. This causes a reprecipitation of the product, which is dried. It has a melting point of 130°–132° C., with decomposition.

The final product after drying in vacuum at 60° C. over phosphorous pentoxide, was analyzed. The analysis was compared with the theoretical analysis of the ureide of thiamine. The results obtained are as follows:

|          | Theory, Percent | Found, Percent | |
|----------|----------------|----------------|-------|
| Carbon   | 45.23          | 45.38          | 45.19 |
| Hydrogen | 5.2            | 5.39           | 5.49  |
| Nitrogen | 20.4           | 20.46          | 20.23 |
| Sulfur   | 9.3            | 9.14           | 9.31  |

The analysis of the product corresponds very closely to the theoretical analysis of the ureide of thiamine hydrochloride. The infrared spectrum of the product showed an absorption band at 5.94 microns which is assigned to the amide grouping. Such an absorption band is not found in thiamine hydrochloride. The product obtained is clearly ureide of thiamine.

The product has antivitamin properties and is an antimetabolite of the vitamin class inhibiting the action of vitamin $B_1$. It acts to decrease the concentration of vitamin $B_1$ in the system.

I claim:

1. The ureide of a compound taken from the class consisting of thiamine and thiamine hydrochloride.

2. A method of making ureide of thiamin which comprises dissolving thiamine hydrochloride in aqueous solution, introducing an alkali metal cyanate into said solution, allowing said solution to stand for a sufficient length of time to precipitate crystalline ureide of thiamine, and recovering the latter from said solution.

3. A method of making ureide of thiamin which comprises dissolving thiamine hydrochloride in aqueous solution, introducing an equimolecular weight of an alkali metal cyanate into said solution, allowing said solution to stand for a sufficient length of time to precipitate crystalline ureide of thiamine, and recovering the latter from said solution.

4. A method of making ureide of thiamin which comprises dissolving thiamine hydrochloride in aqueous solution, introducing an alkali metal cyanate into said solution, allowing said solution to stand for a sufficient length of time to precipitate crystalline ureide of thiamine, and recovering the latter from said solution.

5. A method of making ureide of thiamin which comprises dissolving thiamine hydrochloride in aqueous solution, introducing an alkali metal cyanate into said solution, allowing said solution to stand at a temperature substantially below room temperature for a sufficient length of time to precipitate crystalline ureide of thiamine, and recovering the latter from said solution.

6. A method of making ureide of thiamin which comprises dissolving thiamine hydrochloride in aqueous solution, introducing a water soluble cyanate into said solution, maintaining said solution at about ice bath temperature, allowing said solution to stand for a sufficient length of time to precipitate crystalline ureide of thiamine, and recovering the latter from said solution.

7. A method of making ureide of thiamin which comprises dissolving thiamine hydrochloride in aqueous solution of hydrochloric acid, introducing an alkali metal cyanate into said solution, allowing said solution to stand for a sufficient length of time to precipitate crystalline ureide of thiamine, and recovering the latter from said solution.

8. A method of making ureide of thiamin which comprises dissolving thiamine hydrochloride in aqueous solution of hydrochloric acid in amount by weight about equal to the weight of said thiamine hydrochloride, introducing an alkali metal cyanate into said solution, allowing said solution to stand for a sufficient length of time to precipitate crystalline ureide of thiamine, and recovering the latter from said solution.

9. A method of making ureide of thiamin which comprises dissolving thiamine hydrochloride in aqueous solution, introducing an alkali metal cyanate into said solution, allowing said solution to stand for a sufficient length of time to precipitate crystalline ureide of thiamine, and recovering the latter from said solution, dissolving said product in a small amount of water, adding acetone thereto, and reprecipitating said product.

No references cited.